US006600902B1

(12) United States Patent
Bell

(10) Patent No.: US 6,600,902 B1
(45) Date of Patent: Jul. 29, 2003

(54) MULTIPLE LINK DATA OBJECT CONVEYING METHOD FOR CONVEYING DATA OBJECTS TO WIRELESS STATIONS

(75) Inventor: John R. Bell, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/425,658

(22) Filed: Oct. 22, 1999

(51) Int. Cl.[7] .............................. H04B 5/00; H04M 1/68
(52) U.S. Cl. .......................... 455/41; 455/411; 455/517
(58) Field of Search .......................... 455/41, 411, 566, 455/567, 410, 517; 380/247, 270

(56) References Cited

U.S. PATENT DOCUMENTS

| | | | | |
|---|---|---|---|---|
| 5,898,831 A | * | 4/1999 | Hall et al. .................. | 713/201 |
| 5,982,520 A | * | 11/1999 | Weiser et al. ................ | 359/172 |
| 6,331,972 B1 | * | 12/2001 | Harris et al. ................ | 370/313 |
| 6,334,046 B1 | * | 12/2001 | Philipson et al. ............. | 455/66 |
| 6,434,159 B1 | * | 8/2002 | Woodward et al. ......... | 455/414 |

FOREIGN PATENT DOCUMENTS

| | | | |
|---|---|---|---|
| WO | 97/04602 | 2/1997 | |
| WO | 99/29127 | 6/1999 | ............ H04Q/7/22 |

OTHER PUBLICATIONS

"Specification of the Bluetooth System Core", vol. 1.0A, Jul. 26, 1999.
"IR DA Objet Exchange Protocol", Infrared Data Association, Mar. 18, 1999, vol. 1.2.
"Specification of the Bluetooth System–Profiles", V1,0A, Jul. 26, 1999.
Vcard and Vcalendar, Website HTTP://WWW.IMC.ORG/PDI/, Oct. 18, 1999.

* cited by examiner

Primary Examiner—William Trost
Assistant Examiner—Rafael Perez-Gutierrez
(74) Attorney, Agent, or Firm—Kevin Simons

(57) ABSTRACT

A wireless system comprises a number of wireless stations for communication with each other through short-range wireless links. In a multiple link data object conveying method, in a data conveying session, a first short-range wireless link is set up between a first and a second wireless station of the wireless system. Upon setting up of the first short-range wireless link, first and second personal identification codes are respectively entered in the first and second wireless stations. Thereafter, a data connection through the first wireless link is only set up if the first and second entered personal identification codes are the same. If the data connection is set up the first personal identification code is stored for later use in the session, and the data object is conveyed through the first wireless link. Then, while using the stored first personal identification code, at least a subsequent short-range wireless link is set up from the first wireless station to a third wireless station. After checking whether the third wireless station returned the same personal identification code as the re-used first personal identification code, the same type of data object is conveyed through the subsequent wireless link.

18 Claims, 2 Drawing Sheets

MULTIPLE LINK DATA OBJECT CONVEYING METHOD FOR CONVEYING DATA OBJECTS TO WIRELESS STATIONS

BACKGROUND OF THE INVENTION

1. Field of the Invention

The present invention relates to a method of conveying data objects to wireless stations through short-range wireless links such as radio links, infra-red links, or any other suitable wireless links or combinations of different types of wireless links. The short-range wireless links can be wireless links in accordance with the so-called Bluetooth Specification, or any other suitable short-range wireless link. The wireless stations can be cellular or cordless phones, personal computers, PDAs, laptops, palm pilots, or any other suitable portable devices.

The present invention further relates to a wireless system and to wireless stations for implementing the method.

2. Description of the Related Art

The well-known OSI, Open System Reference model of layers distinguishes seven layers, a physical layer, a data link layer, a network layer, a transport layer, a session layer, a presentation layer and an application layer. Depending on a particular application, several layers may be combined as a single layer. In accordance with the OSI reference model, the physical data flow between system entities occurs through all layers between entities, whereas the logical data flow is defined as a peer to peer communication between corresponding layers of the entities.

The Bluetooth Specification, "Specification of the Bluetooth System—Core", v1.0A, Jul. 26th, 1999, pp. 41–45 and 47, describes a short-range wireless system. In Bluetooth, the range of a wireless link is typically in the order of a few meters. On page 41, a general description of BT, Bluetooth, a short-range radio link, is given. On page 42, a BT piconet with masters and slaves is shown. On pages 43–45, the BT physical channel, with time slots, is shown. Page 45 describes types of links between masters and slaves, a master being a link initiator, and a slave being the device accessed by the master. In this respect, a master/slave relationship exists between devices when a Bluetooth link is established. Once a link has been established, a communication can be initiated by a client or by a server, a client/server relationship existing between applications of the devices involved in a link. In terms of Bluetooth, depending on the device initiating a Bluetooth link, either the server or the client is a master, the other one of the server/client then being a slave. In the server/client relationship, the client sends requests to the server, and the server responds to such requests. As described on page 47, information is exchanged through packets, e.g., using a serial port profile or a more complex object exchange profile as defined in Bluetooth.

The Bluetooth Specification, "Specification of the Bluetooth System—Profiles", v1.0A, Jul. 26th, 1999, pp., describes protocol profiles in Bluetooth. On page 26, a PIN, i.e., a passkey is described that is used to authenticate two BT devices to each other. The PIN is used in a so-called pairing procedure. Pairing is described on page 28. In a pairing procedure both users involved in a wireless link should enter the same PIN in the respective devices of the link. A Service Discovery Protocol is started to find the other one of the client/server pair. Upon the service discovery procedure, as defined on page 66, that is used to locate services that are available on or via devices in the vicinity of a BT enabled device, establishment procedures as defined on page 45 are performed. First a link establishment procedure is performed to establish a physical link between two BT devices. Then, a channel establishment procedure is performed to establish a BT channel, i.e., a logical link, between the two BT devices is established. Thereafter, a connection establishment procedure is performed to establish a connection between applications on the two BT devices. Between a connection request from one of the BT devices and a connection acknowledgement of the other BT device, an authentication procedure may be performed. On pages 336–348 Object Exchange profiles are described to be used by applications running on BT devices, such as Object Push and Object Pull devices. An object push profile can be used by a BT enabled mobile phone to push an object to another BT device. An object pull profile can be used by a mobile phone to pull an object from another mobile phone. With the object profiles push and pull, information such as business card information, calendar information, or any other useful information can be sent to, received from a BT device, or can be exchanged between BT devices, exchange being defined as a push of a business card followed by a pull of a business card. On page 346, object push features are described, such a phone book applications should support vCard, calendar applications that should support vCalendar, messaging applications that should support vMessage, and notes applications that should support vNote.

Instead of a short-range radio link, also other short-range links such as an infra-red link are known, e.g., the IrDA Standard as described in the IrOBEX Specification "IrDA Object Exchange Protocol", Version 1.2, Counterpoint Systems Foundry, Inc and Microsoft Corporation, Mar. 18, 1999. In the IrOBEX specification four OBEX commands are described that can be used to exchange data in a short-range infra red link, the so-called CONNECT, PUT, GET, and DISCONNECT operations. In Section 3.3 OBEX operations and opcode definitions are given, and more particularly Section 3.3.1 on page 23 describes the CONNECT operation, Section 3.3.2 on page 26 describes the DISCONNECT operation, Section 3.3.3 on pages 26 and 27 describes the PUT operation, and Section 3.3.4 on page 29 describes the GET operation. IrDA has been adapted to Bluetooth. In Bluetooth, corresponding commands are described, PUSH corresponding to PUT, and PULL corresponding to GET of the IrOBEX specification. On page 45 of the IrOBEX specification, examples are given of CONNECT, PUT, and GET client requests and server responses. A so-called vCard object in IrOBEX is defining a format of a business card that may include a name, telephone and fax numbers, e-mail addresses, and other types of information. On page 337 of said Bluetooth Specification—Profiles, referred is to the BT IrDA Interoperability Specification.

In the PCT patent application WO 99/29127, a method is disclosed for sending tagged information to a cellular telephone through a short message in a short message service. As described from page 7, line 24 to page 8, line 18 of WO 99/29127, one type of short message is tagged with a header identifying the message as a standardized electronic business card. Such standardized electronic business cards are known as vCards as indicated above, and are described in more detail by Internet Mail Consortium.

vCard and vCalendar are further described on the website of the Internet Mail Consortium. vCard and vCalendar are registered trademarks of the Internet Mail Consortium.

In the PCT patent application WO 97/04602 a method for use in a cellular telephone is disclosed in which PIN, Personal Identification Number, usage is reduced in order to reduce the chance to intercept PINs on an air interface between the cellular telephone and a cellular telephony network. In this method, a user or subscriber of the cellular telephone is only required to enter a PIN when a call is made to a telephone number not previously stored in a separate calling or contact list of the cellular telephone, i.e., a call setup routine of the cellular telephone then bypasses the PIN request and connects such calls. See WO 97/04602, page 2, lines 5–25.

SUMMARY OF THE INVENTION

It is an object of the invention to provide a simple multiple link data object conveying method for use in a wireless system of a type in which wireless links are authorized through matching personal identification codes, without tedious and repetitious entering of personal identification codes for individual links.

It is another object of the invention to provide such a method wherein for all wireless links the same data object conveying task is performed.

It is still another object of the invention to perform the data object conveying task for all involved wireless links within a predetermined time, particularly within a time period in the order of minutes or less.

It is still another object of the invention to use an agreed personal identification code for all wireless links involved in a data object conveying task as agreed upon by users of the wireless stations involved in the wireless links.

It is still another object of the invention to convey, i.e., receive, transmit, or exchange, data objects of different types such as virtual business cards, virtual calendars, virtual notes, or any other suitable data objects.

In accordance with the invention, an application driven multiple link data object conveying method is provided, for use in a wireless system comprising a plurality of wireless stations for communicating with each other through short-range wireless links, said method comprising:

setting up a first short-range wireless link between a first and a second wireless station, while entering a first personal identification code in said first wireless station and a second identification code in said second wireless station, and only establishing a data connection through said first short-range wireless link between said first and second wireless stations when said first and second personal identification codes are the same;

upon a successful establishment of said data connection, running an application in one of said first and second wireless devices, said application initiating a first data object conveying task between said first and second wireless station;

through said application at least setting up a subsequent short-range wireless link to a third wireless station, while, using a stored personal identification code that is the same as said first and second personal identification code, and, after checking whether said third wireless station returns a personal identification code that is the same as said stored personal identification code, initiating performance of a further data object conveying task between said first and third wireless stations.

In a preferred embodiment, the same data object conveying task is performed for all wireless links involved in a conveying session, a data object being a virtual business card, for instance. In such a data object conveying task, some wireless stations may only receive or transmit business card information, and other wireless stations may exchange business card information.

Typically, a data object conveying task is ended, either manually or automatically in the order of thirty seconds after the last session between the wireless stations involved.

The method can be initiated manually, but also automatically, when two or more wireless stations to become involved in a data object conveying session make requests for such a session within a short period of time, within thirty seconds, for instance.

BRIEF DESCRIPTION OF THE DRAWINGS

Throughout the figures the same reference numerals are used for the same features.

DESCRIPTION OF THE PREFERRED EMBODIMENT

Figure 1:
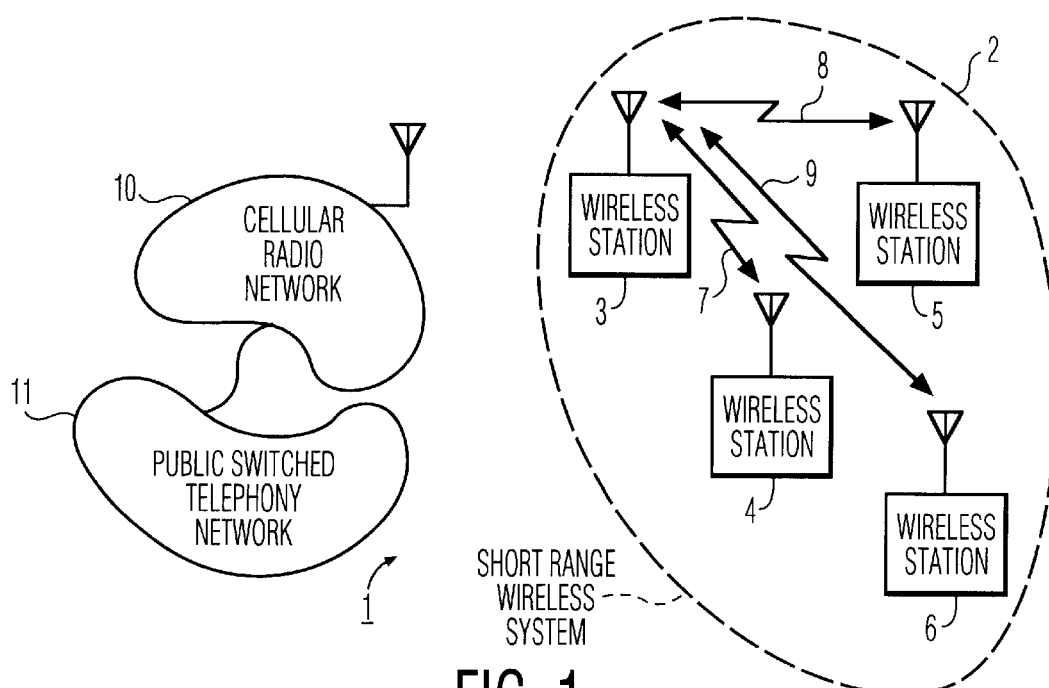
FIG. 1 shows a wireless system with a number of wireless stations in accordance with the present invention.

FIG. 1 shows a wireless system 1 including a short-range wireless system 2 with a number of wireless stations 3, 4, 5, and 6. Shown is the wireless station 3 communicating with the wireless stations 4, 5, and 6 through respective short-range multiple wireless links 7, 8, and 9. In addition thereto, the wireless station can be configured to communicate with a cellular radio network 10, or any other suitable network. The shown cellular radio network 10 may be coupled to a public switched telephony network 11. The wireless stations 3, 4, 5, and 6 can also be configured for short-range wireless communication only. Preferably, through the wireless links 7, 8, and 9 air interface protocols are performed in accordance with said Bluetooth Specification. Alternatively, other suitable short-range wireless link protocols may be used such as according to the so-called HomeRF Standard. The short-range wireless links 7, 8, and 9 can be radio links, infrared links, or any other suitable wireless links, or combinations thereof.

Figure 2:
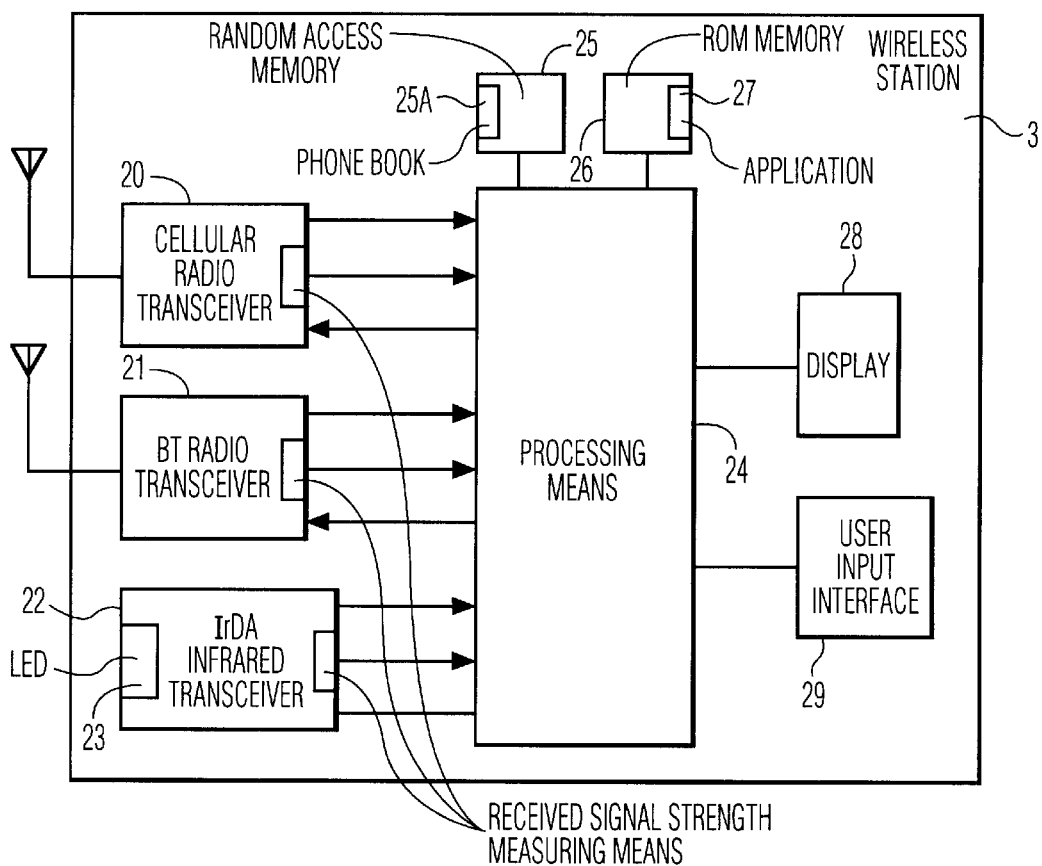
FIG. 2 shows a functional block diagram of a wireless station in accordance with the present invention.

FIG 2. shows a functional block diagram of the wireless station 3 in accordance with the present invention. The wireless stations 4, 5, and 6 are similar in construction and operation. The wireless stations can be cellular phones, personal computers, PDAs, or any other suitable portable device configured and programmed to implement the present invention. The wireless station 3 comprises a cellular radio transceiver 20, a Bluetooth (BT) radio transceiver 21, and an IrDA infrared transceiver 22 with a Light Emitting Diode (LED) 23 for transmitting and receiving modulated infrared signals. The transceivers 20, 21 and 22 comprise receive and transmit circuitry, including mixers, modulators, demodulators, analog-to-digital converters, and digital-to-analog converters so that the transceivers can transmit digital signals generated by processing means 24 and can provide digital signals to the processing means 24. Such transceiver circuitry is well known and is not shown in detail here. The BT transceiver 21 is configured to operate in accordance with said Bluetooth Specification and the IrDA transceiver 22 is configured to operate in accordance with said IrDA Specification. The wireless station 3 further comprises a random access memory (RAM) 25 for storing volatile data with a memory part 25A for storing non-volatile data, a ROM-memory 26 comprising an application 27, a display 28, and a user input interface 29 such as a keyboard or other suitable input means and display control means, the RAM 25, the ROM 26, the display 28, and the user input interface 29 being coupled to the processing means 24. The non-volatile memory 25A may comprise a phone book. The transceivers 20, 21, and 22 respectively comprise receive signal strength measurement means. The application 27, that is distributed over the wireless stations 3, 4, 5, and 6 involved in the multiple link, is a computer program implementing a multiple link data object conveying method according to the invention.

Figure 3:
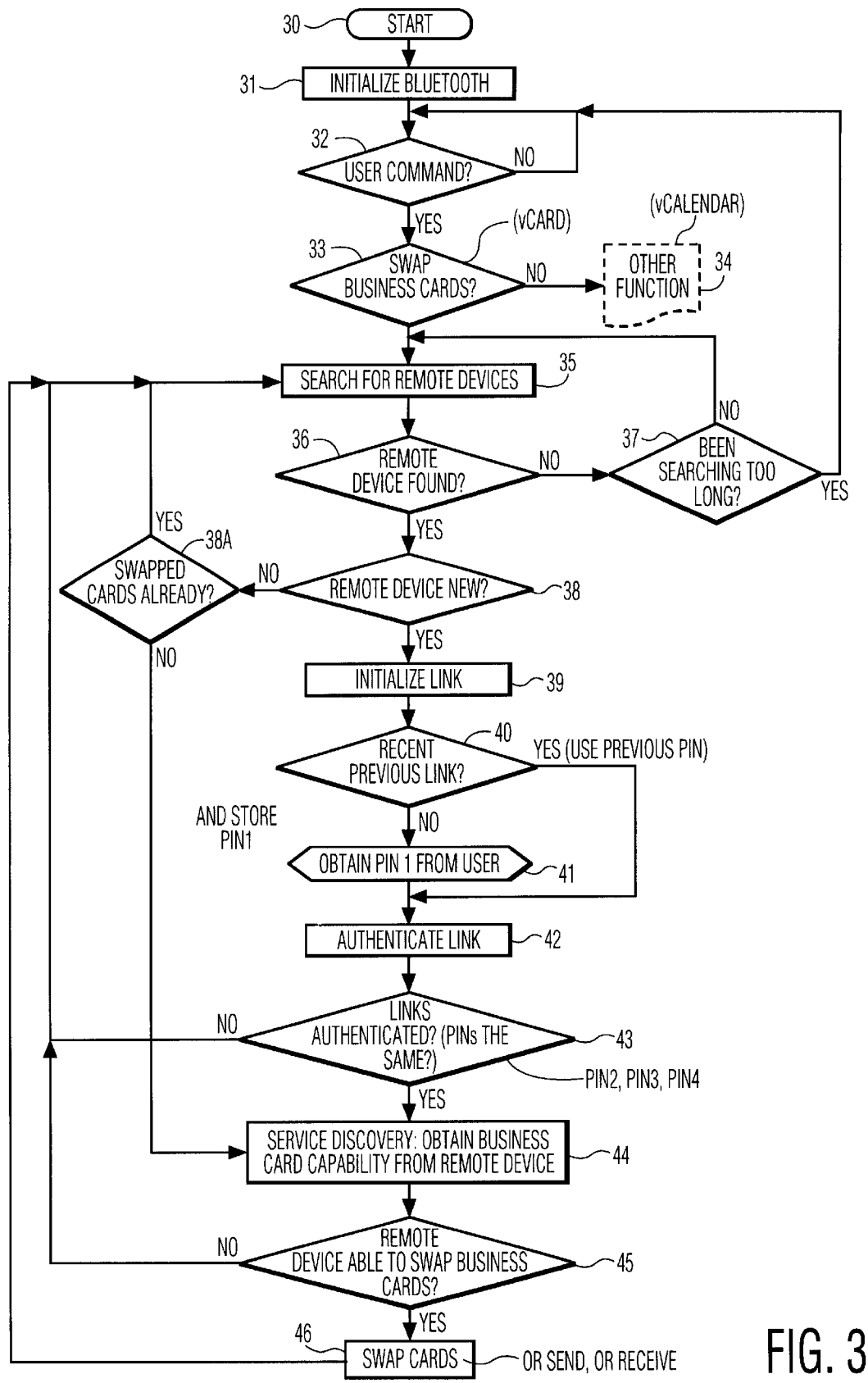
FIG. 3 shows a flow chart to illustrate a method in accordance with the present invention.

FIG. 3 shows a flow chart to illustrate a method in according to the present invention, implemented as a programmed application distributed over the wireless stations involved in a multiple wireless link formed by the wireless links 7, 8, and 9. In the example given all individual wireless station searches, discoveries, link set-ups, data connection establishments, and authentication procedures are in accordance with said Bluetooth Specification. In accordance with the invention, a data object to be conveyed can be a virtual business card vCard, or also virtual calendar information vCalendar, as shown, or any other suitable virtual information. The data format of vCard and vCalendar as such is known from said Internet Mail Consortium. In block 30, the wireless station 3 is switched on, e.g., to perform a data object conveying task, in the example given, to swap, receive, or transmit virtual business cards or virtual calendar information. In accordance with the invention, a typical situation is multiple conveyance, i.e., sending, receiving, or swapping of such business card or calendar information among multiple wireless stations, by users involved in a business meeting or the like. In block 31, Bluetooth is initialized in the wireless station 3. In block 32 it is tested whether an event occurred, such as the user of the wireless station 3 interacting with the user input interface 29. In block 33 the event is tested, e.g., the user desiring to convey virtual business cards. If this is not the case, in block 34 another task is performed, such as displaying another screen on the display 28, making a phone call, or performing another data conveyance task such as conveying virtual calendar information. If the selected task is conveying virtual business cards, in block 35, the wireless station searches for all remote wireless stations. In block 36 it is tested whether a remote wireless station is found. If not, in block 37 it is tested whether a search for wireless stations takes too long. Such a situation arises when no other wireless stations are in-range of the wireless station 3. If the search takes too long, the block 37 returns to the block 32 to wait for a user action. In block 38 it is tested whether the found remote wireless station is new, where a new wireless station does not concurrently have a link with the wireless station 3. If the found remote wireless station or device is not new, in block 38A it is tested whether the device already swapped cards. If so, the search returns to the block 35 in order to search for other remote devices. If this is not the case, a service discovery procedure is performed as will be described later on. If a new remote wireless station has been found, say the wireless station 4, in block 39 the wireless link 7 between the wireless stations 3 and 4 is initialized. Thereafter, in block 40 it is tested if a recent previous link has been established, within the last thirty seconds or so. This is because in a typical situation of exchanging business cards in a meeting, the users first agree on a common personal identification code to be used in the multiple link data conveying method according to the invention, and then start exchanging business card information. The whole process of electronically exchanging is a relatively quick process. So, if the previous link has not been set up recently, it was most likely used for other purposes. If there had not been established a recent previous link, the actual situation up till now, in block 41 the user of the wireless station 3 is prompted to enter a personal identification code PIN1. Upon entering the PIN-code PIN1, the code PIN1 is stored in the memory 25. If there was a recent previous link capable of conveying business card information, the PIN-code PIN1 stored with the recent previous link is used in a process to authenticate a currently found new and business card conveying capable link. In block 42 the currently found business card capable link is authenticated. In this authentication process, the user of the found wireless station is prompted to enter a PIN-code. In the example given, it is assumed that all remote wireless stations are capable of conveying business card information and that respective users of the wireless stations 4, 5 and 6 enter PIN-codes PIN2, PIN3, and PIN4. It is further assumed that, first, the wireless station 4 was found and thereafter the wireless stations 6 and 5, in that order. In block 43 it is successively tested with each found remote wireless station whether the PIN-code entered by the user of the wireless station 3, the PIN-code PIN1, is the same as the PIN-code entered by the users of the remote wireless stations 4, 6, and 5. Assume the user of the wireless stations 4 and 5 shortly after another entered the same PIN-code as the PIN-code PIN1, and the user of the wireless station 6 entered a different PIN-code. Then, initially the wireless stations 3, 4, and,5 are involved in the business card conveying task. If shortly after the last data conveyance task, within a period of thirty seconds, the user of the wireless station 6 re-enters a then same PIN-code, the wireless station 6 is eventually involved in the business card conveying session. Thus, if in a data object conveying process links are made shortly after another, for the same service, so that a succession of links forms a data object exchange session, the user of the wireless station 3 only has to enter a single PIN-code that is automatically used to authenticate links succeeding a recent previous link. The application proceeds in block 44 with a so-called Bluetooth Service Discovery Procedure as described on page 66 of said Bluetooth Specification—Profiles. In the Service Discovery Procedure, in an in itself known manner, services on or via the wireless station 4 are located. In the example given, in block 45, it is checked whether the wireless station 4 is capable of performing the virtual business card conveying service or task. If not, the block 45 returns to the block 35 in order to search for another remote wireless station. If the wireless station 4 is capable of performing the business card conveying service or task, in block 46 the actual data conveying task is performed. In the example given, the data conveying task can be swapping business card information, i.e., exchanging information, between two wireless stations, using the Bluetooth Object Push followed by the BT Object Pull, or can be a receiving only task using the BT Object Pull, or can be a sending only task using the BT Object Push, or any combination of data conveying tasks, depending on the particular needs of the users in a given session. In IrDA, the commands PUT and GET are defined that are similar to the BT Objects PUSH and PULL. Preferably, within one session, all data conveying tasks are the same. This is important to prevent links being made for other unauthorized purposes. For example it should not be possible for the wireless station 3 to swap business cards with one remote wireless station and receive calendar information from another wireless station, in one session. Service discovery and card swapping is also performed for a device that was found not to be new in the block 38 and that had not already swapped cards, provided that such a device is capable of swapping cards.

In accordance with the invention, a data conveying session can be initiated manually by the user of the wireless station 3. In this embodiment, guest book application software included in the application stored in the memory 27 has a special business card exchange option selectable by the user through the user input interface of the wireless station 3. After the user enters a PIN-code, the application automatically performs the complete session. In another embodiment a data conveying session is initiated. In this embodiment, a session is automatically started after two or more link requests made within a short period of time, within thirty seconds, for instance. Requests can be made by the user of the wireless station 3 or by users of the remote wireless stations 4, 5, and 6. In an embodiment, the session can be ended manually, by the user of the wireless station 3 ending the session through the user input interface. In another embodiment, the session can be ended automatically by the application, for example a short period in the order of thirty seconds after the last data conveying task in the session. In Bluetooth, the multiple link data object conveying method applies to new so-called temporary links only, not to so-called semi-permanent links. The application is programmed such that currently active links need not be interrupted or effected in any way. A wireless station could have a link to a PC to access the Internet at the same time business cards are exchanged with other wireless stations.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. In a wireless system comprising a plurality of wireless stations for communication with each other through short-range wireless links, an application driven multiple link data object conveying method, said method comprising:

setting up a first short-range wireless link between a first and a second wireless station, while entering a first personal identification code in said first wireless station and a second identification code in said second wireless station, and only establishing a data connection through said first short-range wireless link between said first and second wireless stations when said first and second personal identification codes are the same;

upon successful establishment of said data connection, running an application in one of said first and second wireless devices, said application initiating a first data object conveying task between said first and second wireless stations;

through said application at least setting up a subsequent short-range wireless link to a third wireless station, while using a stored personal identification code that is the same as said first and second personal identification code, and, after checking whether said third wireless station returns a personal identification code that is the same as said stored personal identification code, initiating performance of a further data object conveying task between said first and third wireless stations; and before setting up said subsequent short-range wireless link, checking whether a predetermined time has elapsed after said setting up of said first short-range wireless link, and presenting a user of said application with said stored personal identification code if said predetermined time has not elapsed.

2. A wireless system comprising:

a plurality of wireless stations for communicating with each other through short-range wireless links;

means for setting up a first short-range wireless link between a first and a second wireless station of said plurality of wireless stations;

means for checking whether a predetermined time has elapsed after said setting up of said first short-range wireless link;

means for setting up at least a subsequent short-range wireless link between said first wireless station and a third wireless station of said plurality of wireless stations, and wherein:

said first and second wireless stations comprising means for entering a first and a second personal identification code, respectively, said first wireless station comprising means for only establishing a data connection through said first short-range wireless link when said entered first and second personal identification codes are the same, and, upon successful establishment of said data connection, means for running an application for conveying a data object between said first and second wireless stations, and means for storing a stored personal identification code that is the same as said first and second identification codes, and said application being configured to automatically initiate said means for said setting up said at least said subsequent short-range wireless link between said first and third wireless stations, while using said stored personal identification code, if said predetermined time has not elapsed.

3. In a wireless system comprising a plurality of wireless stations for communication with each other through short-range wireless links, an application driven multiple link data object conveying method, said method comprising:

setting up a first short-range wireless link between a first and a second wireless station, while entering a first personal identification code in said first wireless station and a second personal identification code in said second wireless station, and only establishing a data connection through said first short-range wireless link between said first and second wireless stations when said first and second personal identification codes are the same;

upon successful establishment of said data connection, running an application in one of said first and second wireless devices, said application initiating a first data object conveying task between said first and second wireless stations;

through said application at least setting up a subsequent short-range wireless link to a third wireless station, while using a stored personal identification code that is the same as said first and second personal identification code, and, after checking whether said third wireless station returns a personal identification code that is the same as said stored personal identification code, initiating performance of a further data object conveying task between said first and third wireless stations; and wherein said multiple link data object conveying method is ended automatically, after a period of time has elapsed after a last performed data object conveying task through said at least set up subsequent short-range wireless link.

4. In a wireless system comprising a plurality of wireless stations for communication with each other through short-range wireless links, an application driven multiple link data object conveying method, said method comprising:

setting up a first short-range wireless link between a first and a second wireless station, while entering a first personal identification code in said first wireless station and a second personal identification code in said second wireless station, and only establishing a data connection through said first short-range wireless link between said first and second wireless stations when said first and second personal identification codes are the same;

upon successful establishment of said data connection, running an application in one of said first and second wireless devices, said application initiating a first data object conveying task between said first and second wireless stations;

checking whether a predetermined time has elapsed after said setting up of said first short-range wireless link; and if said predetermined time has not elapsed, through said application at least automatically setting up a subsequent short-range wireless link to a third wireless station, while using a stored personal identification code that is the same as said first and second personal identification code, and, after checking whether said third wireless station returns a personal identification code that is the same as said stored personal identification code, initiating performance of a further data object conveying task between said first and third wireless stations.

5. A method as claimed in claim 4, comprising establishing of said first short-range wireless link upon discovery by one of said first and second wireless stations of another one of said first and second wireless stations, and of said subsequent short-range wireless link upon discovering of said third wireless station.

6. A method as claimed in claim 4, wherein said multiple link data object conveying method is ended automatically, after a period of time has elapsed after a last performed data object conveying task through said at least set up subsequent short-range wireless link.

7. A method as claimed in claim 4, wherein before said setting up of said first and subsequent short-range wireless links, users of said first, second and at least third wireless station agree upon using the same personal identification code at said setting up.

8. A method as claimed in claim 4, wherein said multiple link data object conveying method is initiated automatically, upon making at least two link requests within a predetermined time.

9. A method as claimed in claim 4, wherein said application checks whether said third wireless station is enabled to perform said first or said further data object conveying task.

10. A method as claimed in claim 4, wherein said further data object conveying task is the same as said first data object conveying task.

11. A method as claimed in claim 4, wherein said multiple link data object conveying method is initiated manually by a user.

12. A method as claimed in claim 4, wherein said first data object conveying task conveys business card information.

13. A method as claimed in claim 12, wherein said business card information is conveyed in the form of a standard virtual business card.

14. A method as claimed in claim 13, wherein said business card information contains phone numbers for storage in a phone book that is accessible through said application.

15. A method as claimed in claim 4, wherein said first data object conveying task conveys calendar information.

16. A method as claimed in claim 4, wherein said multiple link data object conveying method is ended manually.

17. In a wireless system comprising a plurality of wireless stations for communication with each other through short-range wireless links, an application driven multiple link data object conveying method, said method comprising:

setting up a first short-range wireless link between a first and a second wireless station, while entering a first personal identification code in said first wireless station and a second personal identification code in said second wireless station, and only establishing a data connection through said first short-range wireless link between said first and second wireless stations when said first and second personal identification codes are the same;

upon successful establishment of said data connection, running an application in one of said first and second wireless devices, said application initiating a first data object conveying task between said first and second wireless stations;

through said application at least setting up a subsequent short-range wireless link to a third wireless station, while using a stored personal identification code that is the same as said first and second personal identification code, and, after checking whether said third wireless station returns a personal identification code that is the same as said stored personal identification code, initiating performance of a further data object conveying task between said first and third wireless stations; and wherein said multiple link data object conveying method is initiated automatically, upon making at least two link requests within a predetermined time.

18. A first wireless station for use in a wireless system comprising said first wireless station and at least a second and a third wireless station, said wireless stations being configured to communicate with each other through short-range wireless links, and said wireless system further comprising means for setting up a first short-range wireless link between said first and second wireless stations and means for setting up a subsequent short-range wireless link between said first and third wireless stations, said first wireless station comprising:

means for entering a first personal identification code;

means for only establishing a data connection through said first short-range wireless link when said entered first personal identification code is the same as a second personal identification code entered in and received from said second wireless station;

upon successful establishment of said data connection, mean for running an application for conveying a data object between said first and second wireless stations;

means for storing said first personal identification code;

means for checking whether a predetermined time has elapsed after said setting up of said first short-range wireless link; and wherein said application is configured to automatically initiate said means for said setting up said at least said subsequent short-range wireless link between said first and third wireless stations, while using said stored first personal identification code, if said predetermined time has not elapsed.

* * * * *